(12) United States Patent
Hahn (10) Patent No.: US 8,482,568 B2
(45) Date of Patent: Jul. 9, 2013

(54) SYSTEMS AND METHODS FOR SPECIFYING ARBITRARY ANIMATION CONTROLS FOR MODEL OBJECTS

(75) Inventor: Tom Hahn, Piedmont, CA (US)

(73) Assignee: Pixar, Emeryville, CA (US)

( * ) Notice: Subject to any disclaimer, the term of this patent is extended or adjusted under 35 U.S.C. 154(b) by 1203 days.

(21) Appl. No.: 12/041,506

(22) Filed: Mar. 3, 2008

(65) Prior Publication Data

US 2009/0219292 A1 Sep. 3, 2009

(51) Int. Cl.
*G06T 15/70* (2006.01)

(52) U.S. Cl.
USPC ........... 345/473; 345/419; 345/474; 345/475; 345/581; 345/619; 703/6; 715/753

(58) Field of Classification Search
USPC ........ 345/419, 473–475, 581; 703/6; 715/753
See application file for complete search history.

(56) References Cited

U.S. PATENT DOCUMENTS

| | | | | |
|---|---|---|---|---|
| 5,917,730 | A * | 6/1999 | Rittie et al. .................... | 703/6 |
| 7,250,944 | B2 * | 7/2007 | Anderson et al. ............. | 345/419 |
| 7,417,645 | B2 * | 8/2008 | Beda et al. .................... | 345/619 |
| 7,511,718 | B2 * | 3/2009 | Subramanian et al. ....... | 345/619 |
| 7,830,383 | B1 * | 11/2010 | Perttunen ...................... | 345/440 |
| 7,921,369 | B2 * | 4/2011 | Bill ................................ | 715/753 |
| 8,269,777 | B2 * | 9/2012 | Warner et al. ................. | 345/473 |
| 2006/0274070 | A1 * | 12/2006 | Herman et al. ............... | 345/474 |
| 2010/0188410 | A1 * | 7/2010 | Gilbert et al. ................. | 345/473 |

\* cited by examiner

*Primary Examiner* — Kimbinh T Nguyen
(74) *Attorney, Agent, or Firm* — Kilpatrick Townsend & Stockton LLP (57) ABSTRACT

Systems and methods for defining or specifying an arbitrary set of one or more animation control elements or variables (i.e., "avars"), and for associating the set with a model object or part of a model object. Once a set of avars ("avarset") is associated with an object model, a user is able to select that model or part of the model, and the avarset associated with that part of the model is made available to, or enabled for, any animation tool that affords avar editing capabilities or allows manipulation of the model using animation control elements. This enables users to create and save sets of avars to share between characters, or other objects, and shots. In certain embodiments, the user can associate multiple avarsets with a model part and can designate one of those sets as "primary" so that when that model part is selected, the designated primary avarset is broadcast to the available editing tools. Additionally, the user can override the primary designation set and select one of the other sets of avars, or the user can cycle through the various associated avarsets.

43 Claims, 5 Drawing Sheets

SYSTEMS AND METHODS FOR SPECIFYING ARBITRARY ANIMATION CONTROLS FOR MODEL OBJECTS

BACKGROUND

The present invention relates generally to computer graphics and animation. More specifically, the present invention relates to systems and methods for specifying arbitrary sets of animation control variables for model objects presented in animation and modeling tools.

Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

As part of the animation modeling process, it is desirable to directly manipulate objects in a scene to better ensure proper positioning and orientation of objects when an animated scene is displayed. Many current tools exist to facilitate manipulation of objects in a scene. Typically these tools use animation control variables to facilitate manipulation of an object. Different animation control variables enable different manipulation tasks, such as for example translation, rotation or stretching of a model object.

Prior systems provide tools that allow manipulation of model objects in a scene. These systems typically are shipped with default animation control variables tailored to specific tasks. However, it is not possible using prior systems for an animator, developer or other user to specify arbitrary animation control variables for object parts that would persist with that part. For example, it may be desirable for a user to tag a model part with one or more arbitrary animation control variables and have those control variables accessible or enabled any time that model part is selected. Prior systems do not provide such ability.

Therefore it is desirable to provide systems and methods that overcome the above and other problems.

BRIEF SUMMARY

The present invention provides systems and methods that allow users to tag a model geometry with an arbitrary set of animation control variables and for sharing those control variables with other model objects.

Systems and methods are provided that enable users to define or specify an arbitrary set of one or more control elements or variables such as animation control variables ("avars"), and to associate the set with a model object or part of a model object. Once a set of avars ("avarset") is associated with an object model, a user is able to select that model or part of the model, for example, by clicking on that part of the model with a mouse or other user selection element, and the avarset associated with that part of the model is made available to, or enabled for, any animation tool that affords avar editing capabilities or allows manipulation of the model using animation control elements. For example, the avarset associated with a selected part of the model is automatically "broadcast" to any editing tool allowing manipulation of the model in that tool with the associated avars. This enables users to create and save sets of avars to share between characters, or other objects, and shots. In certain embodiments, the user can associate multiple avarsets with a model part and can designate one of those sets as "primary" so that when that model part is selected, the designated primary avarset is broadcast to the available editing tools. Additionally, the user can override the primary designation set and select one of the other sets of avars, or the user can cycle through the various associated avarsets.

According to one embodiment, a computer-implemented method is provided for associating arbitrary control variables with model objects in a modeling and animation tool. The method typically includes specifying an arbitrary set of one or more control variables, associating the specified animation variable set with a model object, and responsive to a selection of the model object, enabling the control variable set for use in controlling the model object.

According to another embodiment, a computer readable medium is provided that stores code for controlling one or more processors to associate arbitrary control variables with model objects in a modeling and animation tool. The code typically includes instructions to receive input specifying an arbitrary set of one or more control variables, associate the specified animation variable set with a model object, and responsive to a selection of the model object, enable the control variable set for use in controlling the model object.

According to yet another embodiment, a system for associate arbitrary control variables with model objects in a modeling and animation tool is provided. The system typically includes a processor, and a memory coupled to the processor, the memory configured to store a set of instructions. When executed by the processor the instructions typically cause the processor to receive input specifying an arbitrary set of one or more control variables, associate the specified control variable set with a model object, and responsive to a selection of the model object, enable the control variable set associated with the model object for use in controlling the model object. A display device such as a monitor is typically included in the system.

According to another embodiment, a modeling and animation tool is provided that includes code modules configured to control a processor or processors to output data representing one or more model objects for display on a display device, receive input specifying an arbitrary set of one or more control variables, associate the specified control variable set with a selected model object, and responsive to a selection of the model object, enable the control variable set associated with the model object for use in controlling or manipulating the model object on the display device.

In certain embodiments, associating the control variable set with a model object includes storing the set with the object data in a database or other data store or storing a link to control variables in the set with the object data, such that when the object data is loaded, the control variables in the associated set are enabled or activated. In some embodiments, input includes user input (e.g., via a graphical user interface) or input from a script or other executable. Similarly, selection of the set may include selection by a user or automatic selection by a script or other executable. In some embodiments, a control variable includes one of an animation control variable (avar) and/or a control variable configured to control an intrinsic property of a model object. Examples of animation control variables include translate control variables, rotate control variables and scaling control variables. Examples of control variables configured to control an intrinsic property of a model object include variables designed to change the color of the object, to change the texture or to control the configuration of the object (e.g., number of eyes of a character).

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION

Embodiments of the present invention provides systems and methods for easily and efficiently specifying groupings of one or more control elements, such as animation control variables or other control variables, and associating groupings with parts of an animation model.

Embodiments of the present invention allow for users to define or specify groupings or sets of one or more control elements or variables such as animation control variables ("avars"), and to associate one or more of these sets with a model object or a part of a model object. A user is then able to select a model or a part of the model, for example, by clicking on that part of the model with a mouse or other user selection element, and the control set associated with that part of the model is made available to, or enabled for, any animation tool that affords control variable editing capabilities or allows manipulation of the model using control elements such as animation control variables. For example, a set of avars (avarset) associated with a selected part of the model is automatically "broadcast" to any editing tool allowing manipulation of the model in that tool with the associated avars. In certain embodiments, the user can associate multiple avarsets with a model part and can designate one of those sets as "primary" so that when that model part is selected, the designated primary avarset is broadcast to the available editing tools. Additionally, the user can override the primary designation set and select one of the other sets of avars, or the user can cycle through the various associated avarsets.

Figure 1:
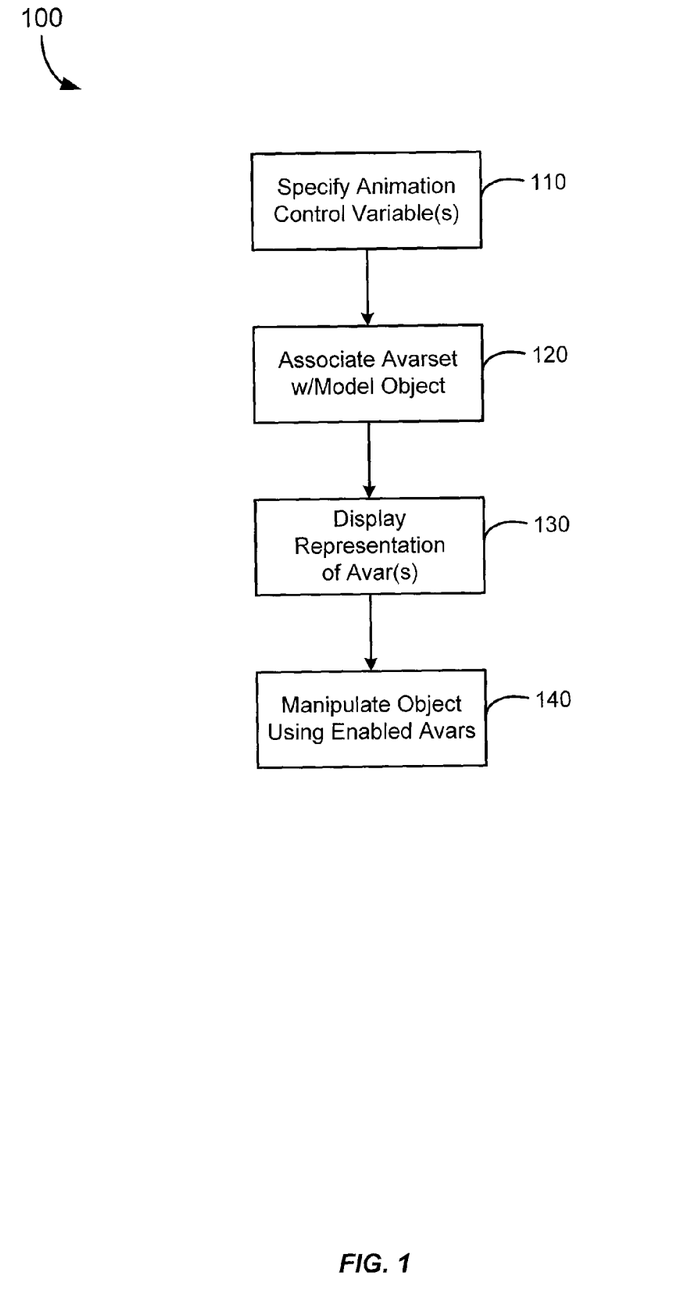
FIG. 1 illustrates a method of associating arbitrary animation control variables with model objects in a modeling and animation tool according to one embodiment.

FIG. 1 illustrates a method 100 of associating arbitrary control variables with model objects in a modeling and animation tool according to one embodiment. In step 110, a user specifies an arbitrary set of one or more control variables to be associated with a model object. In certain embodiments, a control variable includes an avar and/or a control variable configured to control an intrinsic property of a model object. For example, a user may select one or more avars from one or more lists of avars. The user may designate initially a model object or part of a model object for which the selected control variables will be associated. Alternately, the user may select a set of one or more control variables and thereafter designate one or more objects or object parts with which to associate the selected variables. Advantageously the user is able to select control variables intended to manipulate a designated object part or similar object parts and/or they may be selected from control variables that are not intended to manipulate that object part or similar object parts. For example, when selecting avars for a character's right leg, the user might select a rotate avar that was designed specifically for a right leg, or the user might select an avar designed specifically for a right arm. Also, the user might choose to select an avar for the right leg that is designed specifically for manipulating a character's nose. In this manner, a user is able to select arbitrary avars for use on a model object, whether those avars are designed specifically for that object or object part or not. In one embodiment, at least one avar not intended to manipulate the model object is included in the arbitrary avarset. Advantageously, the ability to specify arbitrary sets of control variables, such as avars, for use with a model object frees users from the constraints typical in prior systems and methods.

In step 120, the specified control variable set is associated with the designated model object. In one embodiment, the variables in the set are stored in association with the data for the model object part such that when the object or object part is later selected, those control variables are enabled, whether the object is loaded in the editing tool in which the user created the set, or loaded in another editing tool. For example, when a user selects a model object part that has been loaded into an animation tool, the control variable set associated with that model part is loaded into the animation tool.

In step 130, responsive to a selection of the model object by a user, the control variable set associated with the model object is enabled for use in controlling the model object. In certain embodiments, a representation of the control variables may be displayed. For example, in one embodiment, if a user selects an object or a part of an object having an avarset associated therewith, a representation of that avarset may be displayed. An example might include a slider for a translate avar, or an angular element for a rotate avar. In certain embodiments, where multiple control variable sets are associated with that selected object part, the user is able to designate one set as a primary set so that when the object part is selected, the variables in the primary set are enabled, and a representation of one or more variables in this set is displayed. Where multiple control variable sets are present for an object part, the user may select from among the various sets, e.g., by cycling through the associated sets using a dropdown menu.

In step 140, the user may use the enabled control variable set to manipulate the object according to the attributes and rules of the enabled variables in the set. For example, where an enabled avarset includes a translation avar, the user may select a displayed slider element to designate the degree of translation. Similarly, where an enabled avarset includes a rotation avar, the user may select a displayed angular element to designate the angle and direction of rotation.

It should be appreciated that the model objects with which a control variable set is associated may include animate objects and/or inanimate objects in a scene. It should be appreciated that any type of control element may be used, in addition to avars. Additionally, it should be appreciated that any avar types may be used in addition to translate and rotate avars. Additional avar types might include scaling avars. The remaining discussion will include aspects of the invention in terms of avars and avarsets, however, it should be appreciated that these aspects are equally applicable to sets of control elements including any control variable type as discussed above.

Avarset Broadcasting User Interface and Additional Features

As used herein, "avarset broadcasting" refers to the process of creating and saving sets of avars with model parts and enabling those avars when the model part is selected in an editing or animation tool. Advantageously, avarset broadcasting allows avarsets to be shared between characters (i.e., objects) and between shots, scenes, and the like. This feature is useful for blocking as well as finishing animation, and may be used for both complex and simple avarsets. As discussed above, avarset broadcasting may be used to customize the set of avars that will be broadcast to an editing or animation manipulation tool when a user selects a scope of a model object. As used herein a "scope" refers to a user selectable part of a model in an editing or animation manipulation tool, such as a model object in a scene or a portion of an object in a scene. An example of a scope might include an entire character (model object) in a scene, or a portion of the character, such as the character's arm or leg, hand or foot, toes or fingers, head or nose, etc. For example, one scope might include the entire character, another scope might include the character's left arm, and yet another scope might include the character's left hand. Any number of scopes can be included in a depicted scene having one or multiple objects.

A user may enable the avarset broadcasting feature, for example, by selecting it in a GUI menu, e.g., by toggling an Avarsets>Enable Broadcast Avarsets menu option, or by selecting a hotkey combination, e.g., the Alt+b hotkey. Then, the user may click on scopes in a viewer window to add or enable the associated avars in the current tool (assuming an avarset has been saved for those scopes first, provided from a default avarset, etc.).

Saving an Avarset

Figure 2:
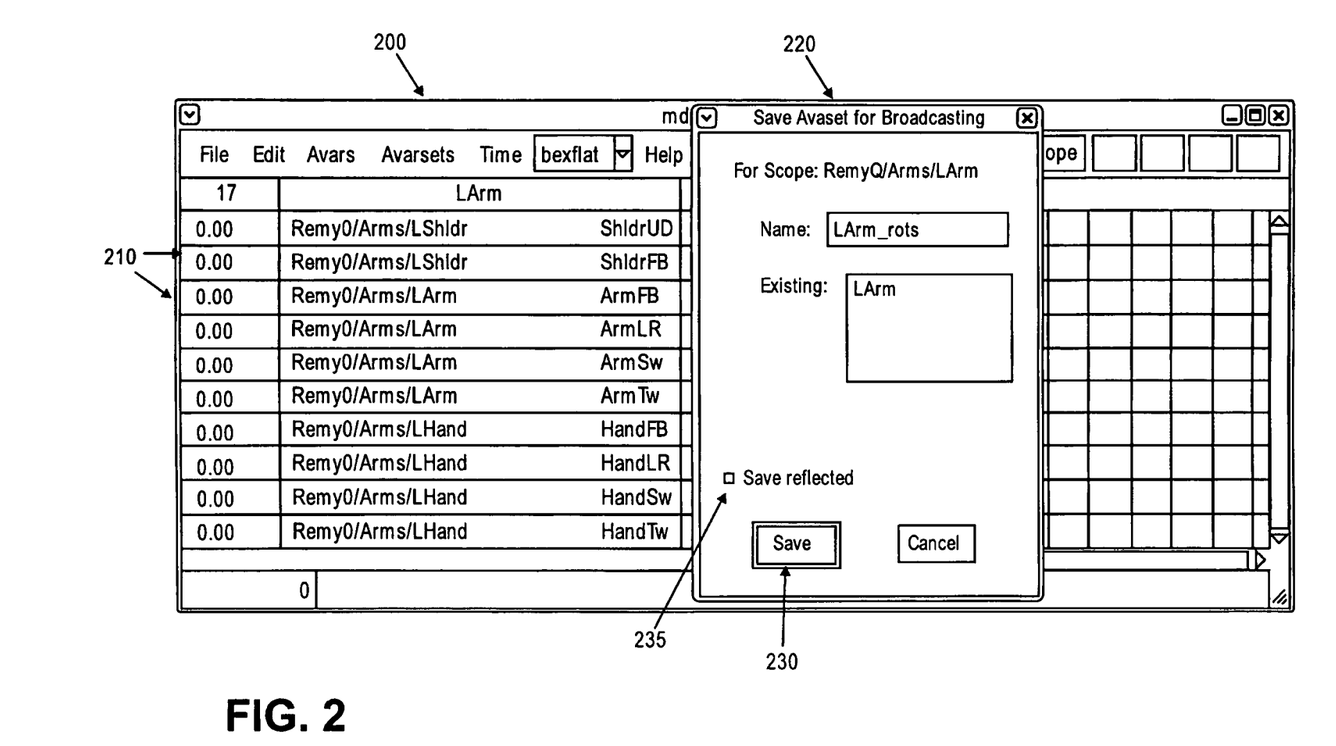
FIG. 2 illustrates an example of a graphical user interface (GUI) display presented to a user when a user is specifying a set of animation control variables to be broadcast for a particular object or portion of an object according to one embodiment.

As above, a user first saves an avarset by loading up one or multiple avars (desired avarset) into the avarset section of the tool. The user may save an avarset by selecting from a GUI menu, e.g., by selecting an Avarsets>Save for Broadcasting menu option, or by selecting a hotkey combination. FIG. 2 illustrates an example of a graphical display 200 presented to a user when a user is specifying an avarset to be broadcast for a particular object or portion of an object. In this example, the graphical display 200 shows a list 210 of selected avars for the character (object) identified as RemyQ. In particular, the avars shown are associated with a portion of the object, namely RemyQ's left arm (identified by "LArm"). As shown, a dialog box 220 including information for the selected avarset is displayed. Information about the selected avars might include a name or other identifying information. The user enters a name or other information as necessary. In this example, for convenience the user has entered the name "LArm_rots" to identify that the avarset is intended to facilitate rotation of the object RemyQ's left arm. The dialog box also includes a save button 230 that allows the user to save the selected avarset for broadcasting. After a user has saved an avarset for a particular object or portion of an object, the saved avarset may be loaded and a representation of the avarset. In this example, whenever a user selects (e.g., clicks on) the object's Left Arm, the rotate control avars associated with the object's left arm are loaded into the current tool.

Avarsets selected for broadcasting may be automatically saved in the creating user's personal avarset library, e.g., under a new folder called "Broadcast". If the user opens up the Broadcast folder in an avarset browser (e.g., any tool that affords avar editing capability) they may be shown for example in a character hierarchy that contains the saved avars.

In certain embodiments, these avarsets are normal in every way; they can be renamed, deleted, copied or moved around to customize what avars will be broadcast.

Symmetry/Pattern Matching

Figure 3:
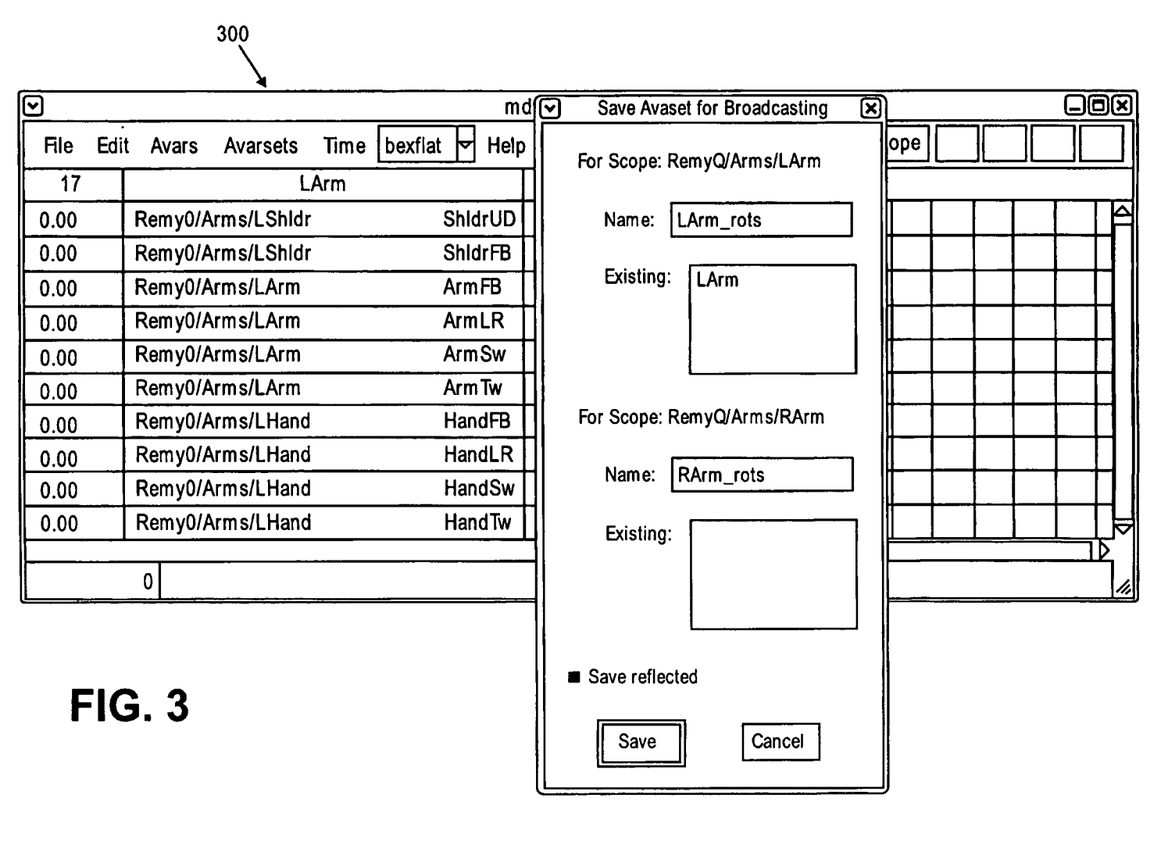
FIG. 3 illustrates an example of what might be displayed if a user toggles the "Save Reflected" button shown in FIG. 2.

In one embodiment, rule based remapping of the associated avars is performed to facilitate use of those avars on different object models. For example, rules associated with the avarset can be used to create additional avarsets that can be used for other model objects. Examples of rules that can be used to remap avars, and thus create new avars, include symmetry rules, reflection rules and pattern matching rules. For example, if a symmetry rule is associated with any of the avars in the selected avarset, the system automatically creates and saves a symmetric avarset. As one specific example, if a scope that has a reflection on the other side of the character is selected, the system automatically creates and saves a reflected version of the avarset. Continuing with the example shown in FIG. 2, FIG. 3 illustrates an example of a graphical display 300 that may be shown if a user toggles the "Save Reflected" button 235. As a user types in the Name field at the top of the dialog box, the system automatically generates the reflected name. For example, in one embodiment, if what the user types starts with an L or R and is followed by a capital letter, the system automatically creates a symmetric avarset name based on the symmetry rules associated with the selected scope. In the example shown, the system automatically creates an avarset title RArm_rots. This avarset would be useful for rotating RemyQ's right arm, for example. Underlying the name creation, a symmetric avarset is created based on the symmetry rule(s) associated with the selected avars. For example, any clockwise rotates might be changed to counterclockwise rotates. When the user selects Save, the scopes and avar names being saved are automatically reflected and stored in a parallel heirarchy.

As another example, the designated model object may be an instance of a model object class. In one embodiment, a second set of animation variables is created for members of the class based on one or more rules associated with the specified animation variables and/or the class. For example, if the object is a member of the class:Arms and a broadcast avarset is created for an instance of a left arm, the system automatically creates an avarset appropriate for a right arm (and/or other members of the class Arms) using the appropriate symmetry, reflection and/or pattern matching rules.

Working with Avarsets

According to one embodiment, a user can save multiple avarsets at any scope, and then pick from among them for example in a viewer. To see all the avarsets that have been saved for a particular scope, for example, in one embodiment the user may select the scope and then use a hotkey such as Alt+g, or the user may select from a main menu, e.g., select an Avarsets>Open Broadcast Avarset Picker menu option. The user may be presented with a popup list from which they can select an avarset. In one embodiment, where multiple avarsets are associated with a scope, one of the list may be set as the default avarset, for example, the last one picked may be the default avarset presented on the display when that scope is next selected. The user may also cycle through the list of associated avarsets, e.g., by using a hotkey, or selecting from a menu, e.g., Avarsets>Get Next Broadcast Avarset menu option, to cycle through the list of avarsets.

Figure 4A:
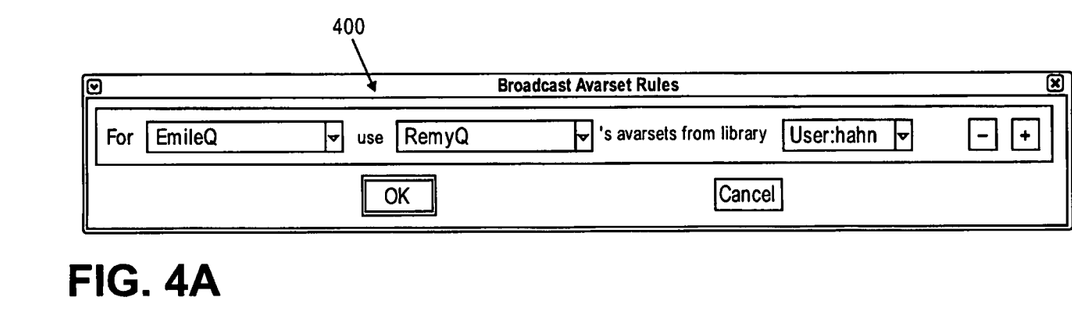
FIG. 4a shows an example of a GUI screen that may be displayed upon selection of a Broadcasting Rules option.

After a user has set up a character model with broadcast avarsets, it may be desirable to re-use one or more of those avarsets on other characters or inanimate objects or pats of the same object. To do this, a user may select the Broadcasting Rules option from a menu. For example, a user might want to use saved avarset for the character Remy for a different character such as Emile. FIG. 4a shows an example of a GUI screen 400 that may be displayed upon selection of this option. As shown, the user may select the character (e.g., EmileQ) for which the avarset will be applied, and the character (RemyQ) and library from which an avarset will be copied. For example, different users may have different avarsets associated with the same object, thus it is desirable to be able to select from among different user libraries.

Figure 4B:
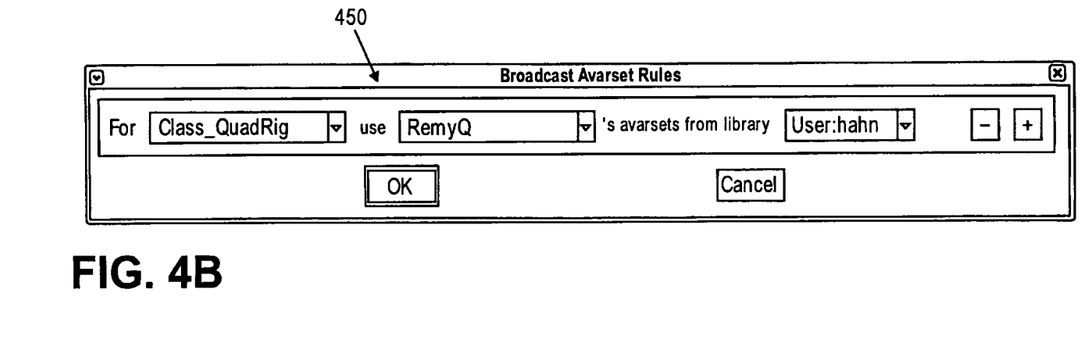
FIG. 4b shows an example of a GUI screen that may be displayed upon selection of this option when an object is a member of a class.

In some cases, the model object may be an instance of a model object class. In this case it may be desirable to share or copy the avarset for a member instance to be used for all members of that class. FIG. 4b shows an example of a GUI screen 450 that may be displayed upon selection of this option when an object is a member of a class. As shown, the user may select a class (e.g., Class_QuadRig) for which an avarset will be applied, and the object in the class (e.g., RemyQ) and library from which an avarset will be copied. In one embodiment, items in the left-most popup like "Class_QuadRig" are hook-class names (basically group names). Each section of the popup contains models that are in the same class hierarchy. So, any character in any scene that is in the class QuadRig can use Remy's avarsets from the selected library, or other class member's avarsets.

In one embodiment, as a default, all avarsets are saved, for example, in the creating user's personal avarset directory or library unless otherwise specified. To save anywhere other than a local directory, the user may use an avarset browser. The user may need to save in their personal library first, then they can copy this avarset into another library using the avarset browser.

In one embodiment, a user may add as many rules as they like; the rules are searched from top down for the first rule that matches. There is always an implied rule before any others that says "Check the character I'm clicking on first." Any avarsets saved for a character are always found before any other rules are consulted. Rules are kept in a user's local default directory and are typically not per-shot; there is no need to explicitly save them. If a user has multiple rules, it can become somewhat confusing as to where a character or object is getting its avarsets. Thus, in one embodiment, when one opens a picker (e.g., Alt+g) they can hover over it, use a mouse left/right click, and the like, to display a tooltip showing them where the avarsets are coming from.

General System Architecture

Figure 5:
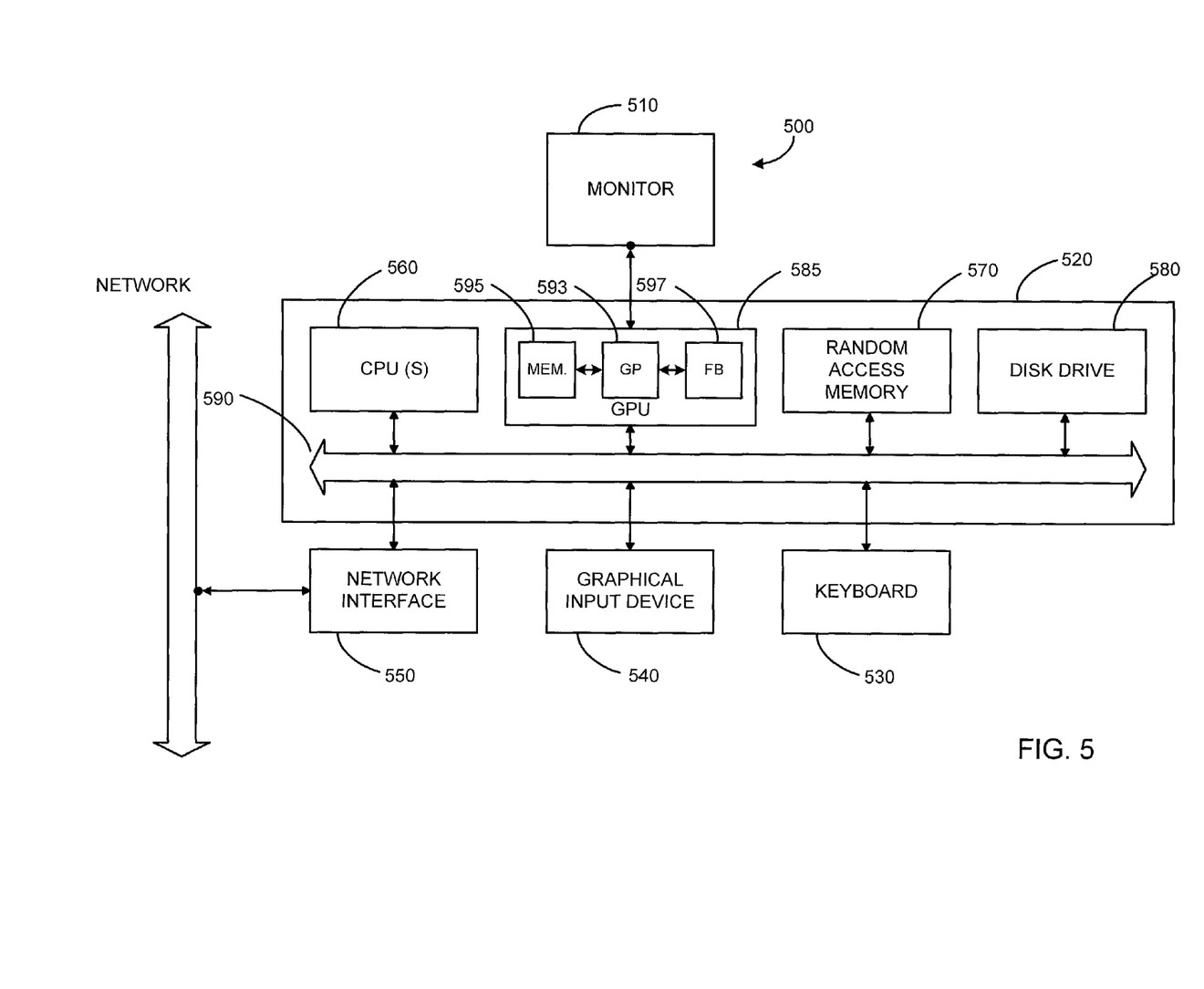
FIG. 5 is a block diagram of a computer system that may be used to practice embodiments of the present invention.

FIG. 5 is a block diagram of a computer system that may be used to practice embodiments of the present invention. FIG. 5 is merely illustrative of an embodiment incorporating the present invention and does not limit the scope of the invention as recited in the claims. One of ordinary skill in the art would recognize other variations, modifications, and alternatives.

In one embodiment, computer system 500 typically includes a monitor 510, computer 520, a keyboard 530, a user input device 540, computer interfaces 550, and the like.

In various embodiments, user input device 540 is typically embodied as a computer mouse, a trackball, a track pad, a joystick, wireless remote, drawing tablet, voice command system, eye tracking system, and the like. User input device 540 typically allows a user to select objects, icons, text and the like that appear on the monitor 510 via a command such as a click of a button or the like.

Embodiments of computer interfaces 550 typically include an Ethernet card, a modem (telephone, satellite, cable, ISDN), (asynchronous) digital subscriber line (DSL) unit, FireWire interface, USB interface, and the like. For example, computer interfaces 550 may be coupled to a computer network, to a FireWire bus, or the like. In other embodiments, computer interfaces 550 may be physically integrated on the motherboard of computer 520, and may be a software program, such as soft DSL, or the like.

In various embodiments, computer 520 typically includes familiar computer components such as a processor 560, and memory storage devices, such as a random access memory (RAM) 570, disk drives 580, a GPU 585, and system bus 590 interconnecting the above components.

In some embodiment, computer 520 includes one or more Xeon microprocessors from Intel. Further, one embodiment, computer 520 includes a UNIX-based operating system.

RAM 570 and disk drive 580 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 500 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 585 may be any conventional graphics processing unit that may be user programmable. Such GPUs are available from NVIDIA, ATI, and other vendors. In this example, GPU 585 includes a graphics processor 593, a number of memories and/or registers 595, and a number of frame buffers 597.

FIG. 5 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Embodiments and aspects of the present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for broadcasting sets of arbitrary animation controls to modeling and animation tools, the method comprising:

receiving, at one or more computer systems, information specifying a set of one or more animation variables, each animation variable in the set of one or more animation variables configured to manipulate part of a model object;

receiving, at the one or more computer systems, information provided via a user interface associating a first named subset of the set of one or more animation variables with a first portion of the model object; and generating, with one or more processors associated with the one or more computer systems, information that configures a modeling and animation tool to display the first named subset of the set of one or more animation variables;

wherein the information that configures the modeling and animation tool to display the first named subset of the one or more animation variables is broadcast to the modeling and animation tool in response to a user interacting with the first portion of the model object via the modeling and animation tool such that the modeling and animation tool displays the first named subset of the set of one or more animation variables.

2. The method of claim 1, wherein the first named subset includes at least one animation variable that is intended to control a different model object.

3. The method of claim 1, wherein the first named subset excludes at least one animation variable that is intended to control the model object.

4. The method of claim 1, wherein receiving the information specifying the set of one or more animation variables comprises receiving a user-defined set of one or more control variables.

5. The method of claim 4, wherein the user specifies the user-defined set of control variables by selecting from a list of multiple control variables available in the modeling and animation tool.

6. The method of claim 1, wherein generating the information that configures the modeling and animation tool to display the first named subset of the set of one or more animation variables comprises storing the information associating the first named subset of the set of one or more animation variables with the first portion of the model object in a database or memory along with data for the model object; wherein the information that configures the modeling and animation tool to display the first named subset of the one or more animation variables is broadcast to the modeling and animation tool from the database or memory.

7. The method of claim 1, further including manipulating, with the one or more processors associated with the one or more computer systems, the model object responsive to a user interaction with a visual representation of at least one animation variable in the first named subset.

8. The method of claim 1, wherein the first named subset includes one of an animation control variable and/or a control variable configured to control an intrinsic property of a model object.

9. The method of claim 1, further including receiving user input designating the model object after receiving the information specifying the arbitrary set of control variables.

10. The method of claim 1, wherein the first named subset includes a control variable having a symmetry rule, the method further comprising:

creating, with the one or more processors associated with the one or more computer systems, a control variable in the set of one or more animation variables having an inverse or reflected symmetry rule; and creating, with the one or more processors associated with the one or more computer systems, a second named subset of the set of one or more animation variables including the created control variable having an inverse or reflected symmetry rule.

11. The method of claim 1, wherein receiving the information associating the first named subset of the set of one or more animation variables comprises receiving information responsive to a set of rules associating the first subset with the first portion of the model object satisfying at least one rule in the set of rules.

12. The method of claim 1, wherein the model object is part of a model level in a model hierarchy and wherein receiving information associating the first subset of the set of one or more control variables with the first portion of the model object includes receiving information associating the first subset with a level above the model level in the hierarchy, whereby model objects in the model level inherit control variable sets associated with levels above the model level.

13. The method of claim 1, wherein the model object is an instance of a model object class, wherein the method further includes creating subsets of the set of one or more animation variables for members of the model object class based on one or more rules associated with the animation variables.

14. The method of claim 13, wherein the one or more rules include one of a symmetry rule, a reflection rule and/or a pattern matching rule.

15. A non-transitory computer readable medium that stores computer-executable code for broadcasting sets of arbitrary animation controls to modeling and animation tools, the non-transitory computer readable medium comprising:

code for receiving information specifying a set of one or more animation variables, each animation variable in the set of one or more animation variables configured to manipulate part of a model object;

code for receiving information provided via a user interface associating a first named subset of the set of one or more animation variables with a first portion of the model object;

code for generating information that configures a modeling and animation tool to display the first named subset of the set of one or more animation variables; and code for broadcasting the information that configures the modeling and animation tool to display the first named subset of the one or more animation variables to the modeling and animation tool in response to a user interacting with the first portion of the model object via the modeling and animation tool such that the modeling and animation tool displays the first named subset of the set of one or more animation variables.

16. The non-transitory computer readable medium of claim 15, wherein the first named subset includes at least one animation variable that is intended to control a different model object.

17. The non-transitory computer readable medium of claim 15, wherein the first named subset excludes at least one animation variable that is intended to control the model object.

18. The non-transitory computer readable medium of claim 15, wherein the code for receiving the information specifying the set of one or more animation variables comprises code for receiving a user-defined set of one or more control variables.

19. The non-transitory computer readable medium of claim 18, wherein the user specifies the user-defined set of control variables by selecting from a list of multiple control variables available in the modeling and animation tool.

20. The non-transitory computer readable medium of claim 15, wherein the code for generating the information that configures the modeling and animation tool to display the first named subset of the set of one or more animation variables comprises code for storing the information associating the first named subset of the set of one or more animation variables with the first portion of the model object in a database or memory along with data for the model object; wherein the information that configures the modeling and animation tool to display the first named subset of the one or more animation variables is broadcast to the modeling and animation tool from the database or memory.

21. The non-transitory computer readable medium of claim 15, further comprising code for manipulating the model object responsive to a user selection of a representation of at least one control variable in the first subset.

22. The non-transitory computer readable medium of claim 15, wherein the first subset includes one of an animation control variable and/or a control variable configured to control an intrinsic property of a model object.

23. The non-transitory computer readable medium of claim 15, further comprising code for receiving user input designating the model object after receiving the information specifying the arbitrary set of control variables.

24. The non-transitory computer readable medium of claim 15, wherein the first subset includes a control variable having a symmetry rule, further comprising code for creating a control variable in the set of one or more animation variables having an inverse or reflected symmetry rule; and code for creating a second named subset of the set of one or more animation variables including the created control variable having an inverse or reflected symmetry rule.

25. The non-transitory computer readable medium of claim 15, wherein the code for receiving the information associating the first named subset of the set of one or more animation variables comprises receiving information responsive to a set of rules associating the first subset with the first portion of the model object satisfying at least one rule in the set of rules.

26. The non-transitory computer readable medium of claim 15, wherein the model object is part of a model level in a model hierarchy and wherein the code for receiving the information associating the first subset of the set of one or more control variables with the first portion of the model object include code for receiving information associating the first subset with a level above the model level in the hierarchy, whereby model objects in the model level inherit control variable sets associated with levels above the model level.

27. The non-transitory computer readable medium of claim 15, wherein the model object is an instance of a model object class, further comprising code for creating subsets of the set of one or more animation variables for members of the model object class based on one or more rules associated with the animation variables.

28. The non-transitory computer readable medium of claim 27, wherein the one or more rules include one of a symmetry rule, a reflection rule and/or a pattern matching rule.

29. A system for facilitating manipulation of model objects in modeling and animation tools, the system comprising:
a processor; and
a memory coupled to the processor, the memory configured to store a set of instructions which when executed by the processor cause the processor to:
receive information specifying a set of one or more animation variables, each animation variable in the set of one or more animation variables manipulate part of a model object;
receive information provided via a user interface associating a first named subset of the set of one or more animation variables with a first portion of the model object; and
generate information that configures a modeling and animation tool to display the first named subset of the set of one or more animation variables;
wherein the information that configures the modeling and animation tool to display the first named subset of the one or more animation variables is broadcast to the modeling and animation tool in response to a user interacting with the first portion of the model object via the modeling and animation tool such that the modeling and animation tool displays the first named subset of the set of one or more animation variables.

30. The system of claim 29, further including a display configured to display the model object and representations of one or more of the animation variables in first named set.

31. The system of claim 29, wherein the first named subset includes at least one animation variable that intended to control a different model object.

32. The system of claim 29, wherein at least one control variable that is intended to control the model object is not included in the first named subset.

33. The system of claim 29, wherein to receive the information specifying the set of one or more control variables the instructions cause the processor to receive a user-defined set of one or more control variables.

34. The system of claim 29, wherein to generate the information that configures the modeling and animation tool to display the first named subset of the set of one or more animation variables the instructions cause the processor to store the information associating the first named subset of the set of one or more animation variables with the first portion of the model object in the memory along with data for the model object.

35. The system of claim 29, wherein the memory further includes instructions which cause the processor to manipulate the model object responsive to user selection of a representation of at least one control variable in the first named subset.

36. The system of claim 29, wherein the first named subset includes one of an animation control variable and/or a control variable configured to control an intrinsic property of a model object.

37. The system of claim 29, wherein the memory further includes instructions which cause the processor to receive user input designating the model object after receiving the information specifying the arbitrary set of control variables.

38. The system of claim 29, wherein the first named subset set includes a control variable having a symmetry rule, the memory further comprising instructions which cause the processor to create a control variable having an inverse or reflected symmetry rule.

39. The system of claim 29, wherein to receive the information associating the first named subset of the set of one or more animation variables the memory further includes instructions which cause the processor to receive information responsive to a set of rules associating the the first named subset with the first portion of the model object satisfying at least one rule in the set of rules.

40. The system of claim 29, wherein the model object is part of a model level in a model hierarchy and wherein to receive the information associating the first named subset of the set of one or more control variables with the first portion of the model object the memory includes instructions which cause the processor to receive information associating the first named subset with a level above the model level in the hierarchy, whereby model objects in the model level inherit control variable sets associated with levels above the model level.

41. The system of claim 29, wherein the model object is an instance of a model object class, further comprising instructions which cause the processor to create subsets of the set of one or more animation variables for members of the model object class based on one or more rules associated with the animation variables.

42. The system of claim 41, wherein the one or more rules include one of a symmetry rule, a reflection rule and/or a pattern matching rule.

43. A modeling and animation tool encoded upon a non-transitory computer readable medium, including code modules configured to control a processor or processors to:

output data representing one or more model objects for display on a display device;

receive input specifying an arbitrary set of one or more control variables;

generate a user interface configured with functionality that enables a user to associate named subsets of the arbitrary set of one or more control variables with portions of the one or more model objects;

receive information provided via the user interface associating a named subset of the arbitrary set of one or more control variables with a selected model object, the associated named subset having a plurality of scopes, each scope in the plurality of related to different portions of the selected model object;

receive a broadcast from a database storing the information provided via the user interface associating the named subset of the arbitrary set of one or more control variables with the selected model object in response to a user interaction with at least one of the different portions of the selected model object; and output data representing visual representations of the first named subset of the set of one or more animation variables on the display device.

* * * * *